United States Patent
Lawrence et al.

(10) Patent No.: US 7,325,870 B2
(45) Date of Patent: Feb. 5, 2008

(54) CHILD RESTRAINT SYSTEM WITH IN-MOTION BELT STATUS MONITORING

(75) Inventors: Rodney A. Lawrence, Frankfort, IN (US); Kevin D. Kincaid, Kokomo, IN (US); Duane D. Fortune, Lebanon, IN (US); Stephen B. Porter, Noblesville, IN (US); Stuart S. Sullivan, Peru, IN (US); Edward J. Wallner, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 89 days.

(21) Appl. No.: 11/222,028

(22) Filed: Sep. 8, 2005

(65) Prior Publication Data

US 2006/0049929 A1    Mar. 9, 2006

Related U.S. Application Data

(60) Provisional application No. 60/607,988, filed on Sep. 8, 2004.

(51) Int. Cl.
*A47D 1/10* (2006.01)

(52) U.S. Cl. .................................................. 297/250.1
(58) Field of Classification Search ............. 297/217.3, 297/217.2, 467, 473, 483, 250.1; 340/457.1; 701/45; 280/801.1
See application file for complete search history.

(56) References Cited

U.S. PATENT DOCUMENTS 5,260,684 A    11/1993    Metzmaker
5,454,591 A    10/1995    Mazur et al.
5,656,994 A     8/1997    Heninger ................. 340/457.1
5,711,574 A     1/1998    Barnes .................. 297/216.11
5,720,519 A     2/1998    Barnes .................. 297/216.11
6,151,540 A    11/2000    Anishetty ................... 701/45
6,246,936 B1    6/2001    Murphy et al. .............. 701/45
6,264,236 B1 *  7/2001    Aoki ......................... 280/735
6,272,936 B1    8/2001    Oreper et al. .......... 73/862.621
6,371,516 B1    4/2002    Miyagawa ................. 280/735
6,438,476 B1    8/2002    Gray et al. .................. 701/45
6,490,936 B1   12/2002    Fortune et al. ........ 73/862.581

(Continued)

FOREIGN PATENT DOCUMENTS

GB    2290505    1/1996

OTHER PUBLICATIONS

Micronas, Mar. 2003, HAL 18xx, Low-Cost Programmable Linear Hall-Effect Sensor (2 pages).

(Continued)

*Primary Examiner*—Milton Nelson, Jr.
(74) *Attorney, Agent, or Firm*—Douglas D. Fekete

(57) ABSTRACT

A child restraint system includes a belt assembly for restraining a child occupant and a control unit for monitoring proper adjustment of the belt assembly. The belt assembly may include a belt harness affixed to the child restraint system or a vehicle belt seat. The child restraint system also includes a sensor for detecting the presence of the child occupant, a sensor for determining whether the belt assembly is properly adjusted, and a sensor for determining whether the vehicle is in motion. The control unit provides an alert signal if the child is present, the vehicle is in motion and the belt assembly is not properly adjusted.

15 Claims, 3 Drawing Sheets

U.S. PATENT DOCUMENTS

| | | | |
|---|---|---|---|
| 6,554,318 B2 | 4/2003 | Kohut et al. | 280/801.1 |
| 6,578,871 B2 | 6/2003 | Gray et al. | 280/735 |
| 6,587,770 B1 | 7/2003 | Gray et al. | 701/45 |
| 6,605,877 B1 | 8/2003 | Patterson et al. | 307/10.1 |
| 6,644,689 B2 | 11/2003 | Murphy | 280/735 |
| 6,650,978 B1 | 11/2003 | Patterson et al. | 701/35 |
| 6,662,094 B2 | 12/2003 | Murphy et al. | 701/45 |
| 6,683,534 B2 | 1/2004 | Patterson et al. | 340/436 |
| 6,749,038 B2 | 6/2004 | Sullivan et al. | 180/268 |
| 6,796,192 B2 | 9/2004 | Sullivan et al. | 73/862.391 |
| 6,812,844 B1* | 11/2004 | Burgess | 340/573.1 |
| 6,818,842 B2 | 11/2004 | Gray et al. | 177/144 |
| 6,847,302 B2 | 1/2005 | Flanagan et al. | 340/666 |
| 6,850,825 B2 | 2/2005 | Murphy et al. | 701/45 |
| 6,851,503 B2 | 2/2005 | Almaraz et al. | 180/268 |
| 6,854,415 B2 | 2/2005 | Barnes et al. | 116/67 R |
| 6,868,745 B2 | 3/2005 | Sullivan et al. | 73/862.391 |
| 6,889,146 B2 | 5/2005 | Sullivan et al. | 702/43 |
| 2004/0113634 A1 | 6/2004 | Stanley et al. | |
| 2004/0113797 A1 | 6/2004 | Osborne | |
| 2005/0030188 A1 | 2/2005 | Flanagan et al. | 340/667 |
| 2005/0092539 A1* | 5/2005 | Chitalia et al. | 180/271 |
| 2005/0121956 A1* | 6/2005 | Dolan et al. | 297/253 |
| 2005/0189805 A1* | 9/2005 | Burley et al. | 297/250.1 |
| 2005/0194779 A1* | 9/2005 | Ito et al. | 280/801.1 |
| 2005/0275276 A1 | 12/2005 | Patterson | |

OTHER PUBLICATIONS

International Search report dated Apr. 10, 2007 for PCT/US2005/32172.

* cited by examiner

CHILD RESTRAINT SYSTEM WITH IN-MOTION BELT STATUS MONITORING

CROSS REFERENCE TO RELATED APPLICATION

This application claims the benefits of U.S. Provisional Application No. 60/607,988, filed Sep. 8, 2004, which is incorporated herein by reference.

This application is also related to the following U.S. patent applications, filed Jun. 6, 2005: CHILD RESTRAINT SYSTEM COMPRISING WEIGHT SENSOR, U.S. patent application Ser. No. 11/146,921; CHILD SEAT AND MONITORING SYSTEM, U.S. patent application Ser. No. 11/146,927; CHILD SEAT AND MONITORING SYSTEM, U.S. patent application Ser. No. 11/146,928; CHILD SEAT MONITORING SYSTEM AND METHOD FOR DETERMINING A TYPE OF CHILD SEAT, U.S. patent application Ser. No. 11/146,939; CHILD RESTRAINT SYSTEM AND METHOD FOR MONITORING INSTALLATION OF THE CHILD RESTRAINT SYSTEM, U.S. patent application Ser. No. 11/146,926; CHILD RESTRAINT SYSTEM AND METHOD FOR MONITORING INSTALLATION OF THE CHILD RESTRAINT SYSTEM, U.S. patent application Ser. No. 11/147,148; CHILD RESTRAINT SYSTEM COMPRISING CONTROL UNIT FOR EVALUATING HARNESS ADJUSTMENT, U.S. patent application Ser. No. 11/147,149 the contents each of which are incorporated herein by reference thereto.

TECHNICAL FIELD OF INVENTION

This invention relates to a child restraint system that includes one or more sensors coupled to a control unit for evaluating proper adjustment a vehicle or harness belt. More particularly, this invention relates to such child restraint system that also includes sensor for detecting vehicle motion and wherein the control unit provides an alert in the event that the status of the belt adjustment changes while the vehicle is in motion.

BACKGROUND OF INVENTION

A child restraint system, also referred to as a child car seat, is used for safely transporting a child within an automotive vehicle, so as to minimize the risk of injury to the child in the event of an accident. The design of the child restraint system is based upon the size of the child. For young infants, a typical rear-facing infant seat comprises a removable carrier adapted to be mounted in a base securely installed in the vehicle. The carrier includes a belt harness to restrain the child within the carrier. A forward-facing seat is recommended for older infants and also may include a belt harness. It is recommended that an older child be seated in a booster seat and restrained by a vehicle seat belt. Since vehicle seat belts are commonly designed for adults, the booster seat includes guides that position the belt to safely restrain the smaller child.

It has been proposed to equip the child restraint system with one or more sensors coupled to an electronic control unit to alert the adult operator if the child restraint system is not properly installed in the vehicle, or not adjusted properly for the child. For example, in a belt-positioning booster seat, the seat may include sensors that detect the belt, so as to enable the control unit to alert the adult operator if the seat belt is not properly positioned. The booster seat is installed in the rear seat of the vehicle. As the child matures, the child may learn to disengage the buckle that secures the vehicle belt. If the child unbuckles the belt while the vehicle is being operated, the adult operator in the front seat may not be aware that the child is no longer properly restrained.

Therefore, a need exists for a child restraint system that monitors the adjustment of the belt while the vehicle is in motion, and alerts the operator in the event that the status or condition of the belt changes so that the belt is no longer properly adjusted to restrain the child.

SUMMARY OF THE INVENTION

In accordance with this invention, a method is provided for monitoring a belt assembly for restraining a child occupant while the vehicle is in motion. A belt assembly may include a belt harness affixed to the child restraint system or a vehicle belt seat used for restraining the child in the child seat. The method comprises detecting the child occupant in the child restraint system and determining whether the belt assembly is properly adjusted for restraining the child occupant. The method further comprises determining whether the vehicle is in motion; and if the vehicle is in motion and the belt assembly is not properly adjusted, issuing an alert. Thus, after the child is placed in the child restraint system and the belt assembly is secured in the proper position, in the event that the belt assembly becomes unsecured, the adult operator of the vehicle is promptly alerted.

This invention also provides a child restraint system that includes a belt assembly for restraining a child occupant within the child restraint system, and a control unit. A child presence sensor is mounted on the child restraint system and provides a child present signal in response to the child occupant. The child restraint system also includes a sensor strategically located to provide a signal indicative of proper adjustment of the belt assembly. A sensor mounted on the child restraint system provides a signal in response to motion of the vehicle. The control unit is coupled to the sensors to receive the child present signal, the belt adjustment signal and the vehicle motion signal and includes a microprocessor configured to determine whether a child occupant is present, whether the belt assembly is properly adjusted and whether the vehicle is in motion. The control unit provides an alert signal when the child occupant is present, the vehicle is in motion and the belt assembly is not properly adjusted.

BRIEF DESCRIPTION OF DRAWINGS

This invention will be further described with reference to the accompanying drawings in which.

DETAILED DESCRIPTION OF INVENTION

Figure 1:
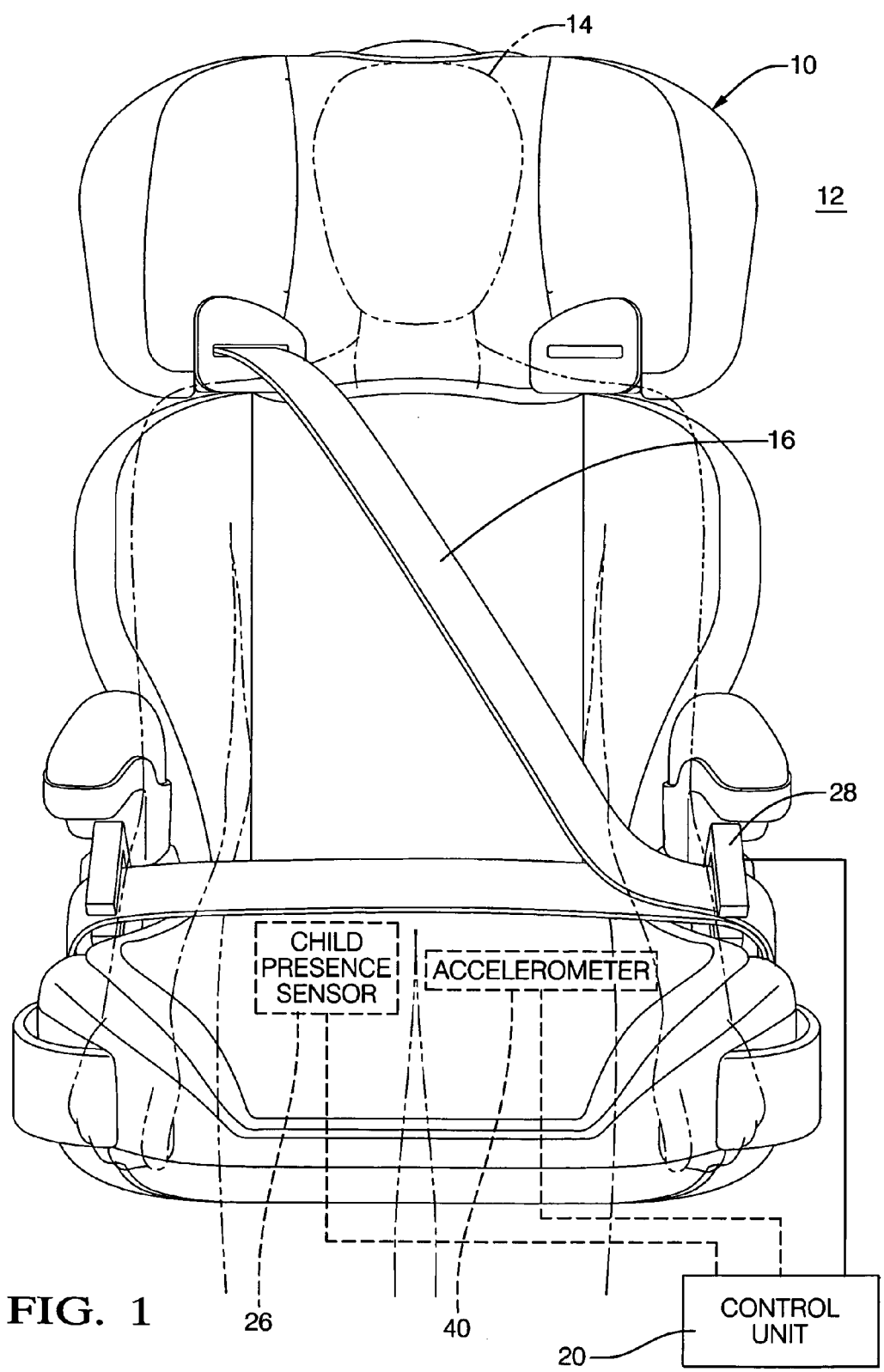
FIG. 1 is a plan view showing a belt-positioning booster seat for use in accordance with this invention.

In accordance with a preferred embodiment of this invention, referring to FIG. 1, there is depicted a belt-positioning booster seat 10 installed in a rear seat 12 of an automotive vehicle for safely transporting a child occupant 14. Child 14 is restrained in seat 10 by a three-point vehicle seat belt 16 such as is standard equipment in an automotive vehicle. A suitable booster seat is commercially available from Graco Children's Products, Inc. under the trade designation Turbo Booster.

Seat 10 comprises a control unit 20 for evaluating conditions relating to proper adjustment or installation of the seat. For this purpose, the booster seat includes sensors electrically coupled to the control unit. The sensors measure properties and provide electrical signals to the control unit, the value of which are indicative of the condition being monitored. The control unit evaluates the condition based upon the measured values of the property and provides an alert for an adult operator. One type of alert may include a visual display, such as a series of red and green lights to indicate proper or improper adjustment of particular conditions. In accordance with this invention, which monitors restraining belt status while the vehicle is in motion, the alert is preferably audible, such as a chime or buzzer, to provide an alarm to the operator without distracting the operator's vision.

In accordance with this invention, seat 10 comprises a sensor 26 that provides a signal indicative of the presence of the child in the seat. A suitable sensor may be a contact switch located in the base of the seat that is normally open and is closed in response to the weight of child 14, thereby providing a signal to the control unit. Alternately, sensor 26 may be a weight sensor comprising a bladder containing a fluid connected to a pressure sensor that provides an electrical signal to the control unit, such that the weight of the child increases the fluid pressure as indicated by the value of the signal.

Figure 2:
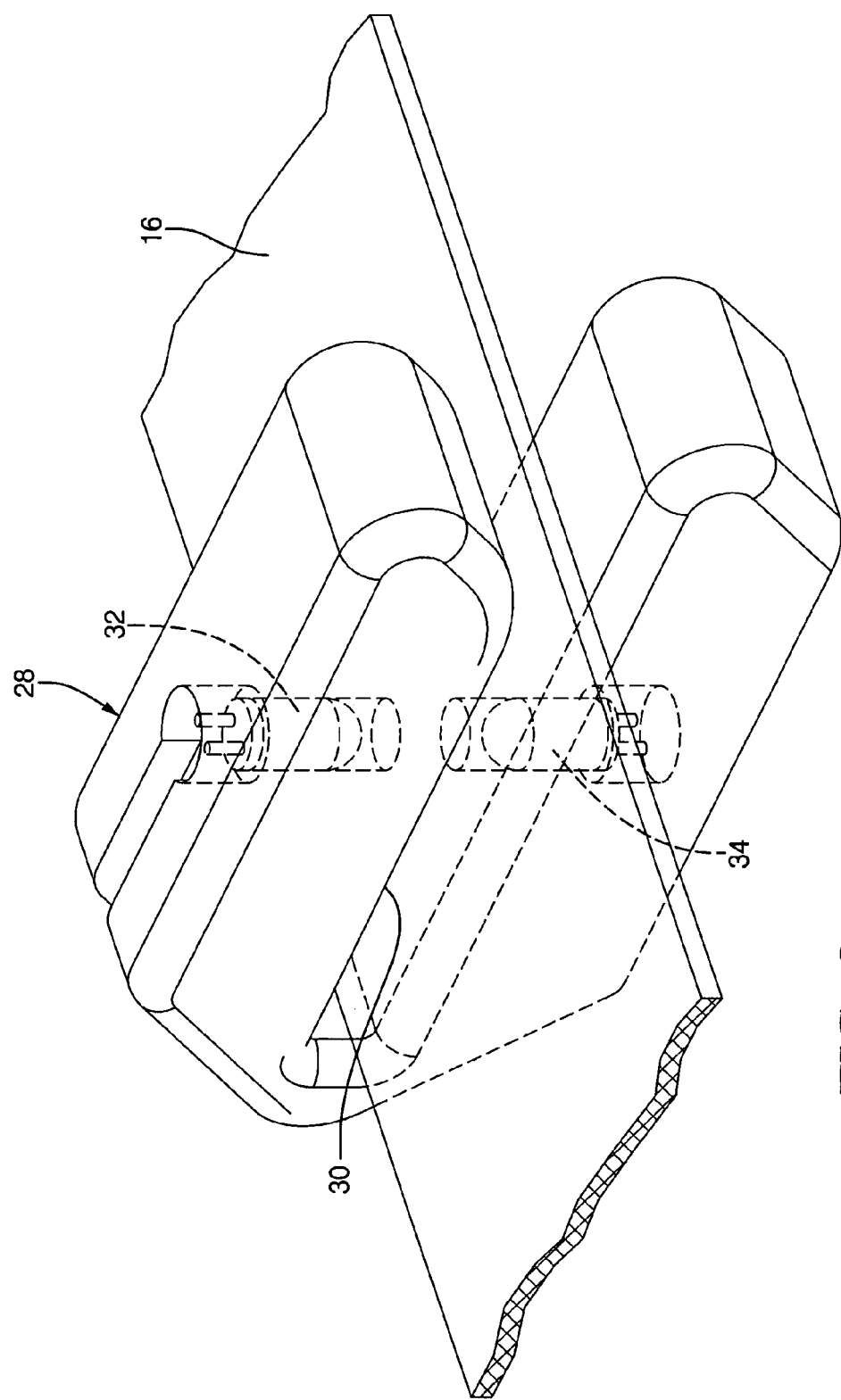
FIG. 2 is a view of a sensor for detecting belt position in the booster seat in FIG. 1.

Seat 10 is also equipped with a belt guide 28 strategically located for properly positioning belt 16 when child 14 is seated for transport. As shown in FIG. 2, guide 28 defines a slot 30 for receiving belt 16. A light emitting diode 32 is mounted in guide 28 at one side of slot 30 and aligned with a photodetector 34 mounted in the opposite side of the slot. In the absence of the belt, photodetector 34 receives light emitted by diode 32 and outputs a signal to the control unit indicative of no belt. When the child is seated in seat 10 and restrained by belt 16 received in guide 28, a condition representing proper adjustment of the belt, the belt within slot 30 blocks light between diode 32 and photodetector 34, whereupon photodetector 34 outputs a signal to the control unit indicative of the presence of the belt within the slot.

In accordance with this invention, seat 10 further comprises a sensor 40 for detecting vehicle motion. A preferred sensor is a micromachined capacitive accelerometer commercially available from Freescale Inc. under part number MMA2260D. The accelerometer provides an output that is a function of acceleration of the vehicle in direction of the longitudinal axis of the vehicle. The value of the signal is directly proportional to the acceleration. For forward motion of the vehicle, the output has a positive value for acceleration and a negative value for deceleration. It is noted that acceleration in a reverse direction, as when the vehicle is backing up, is indicated by a negative value.

Control unit 20 comprises a microprocessor and a program of computer instructions, including instructions for monitoring belt condition while the vehicle is in motion in accordance with this invention. In the preferred embodiment, in general, the computer program determines the presence of child 14 based upon the value of the signal from sensor 26, determines the location of belt 16 within guide 28 based upon the value of the signal from photodetector 34, and determines the motion of the vehicle based upon the integral of periodic acceleration signals from accelerometer 40.

Figure 3:
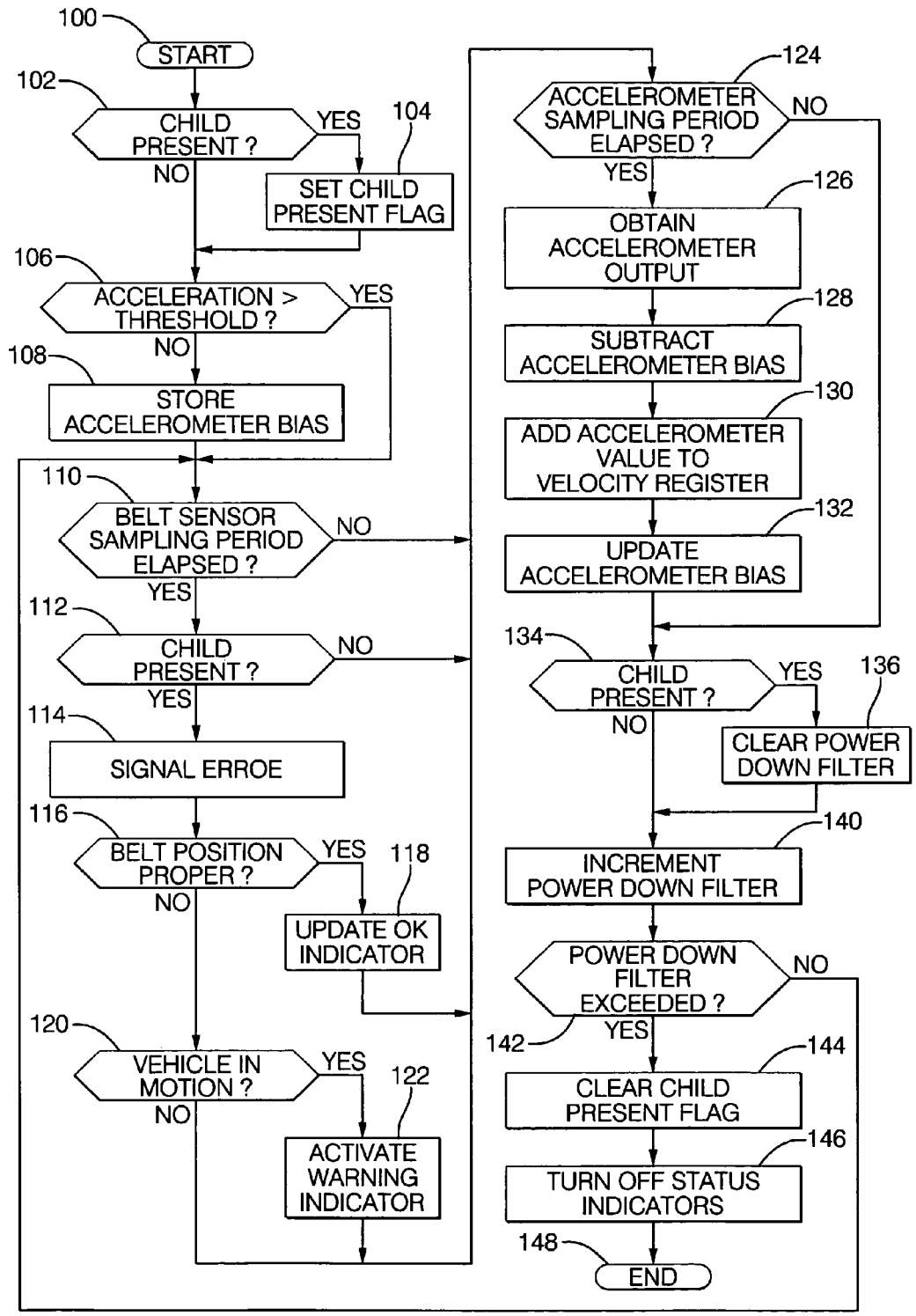
FIG. 3 is a flow diagram of a method for monitoring belt conditions while a vehicle is in motion in accordance with this invention.

Referring to FIG. 3, there is depicted a flow diagram for a computer program carried out by the control unit for monitoring the condition of seat belt 16 during motion of the vehicle in accordance with a preferred embodiment of this invention. At start 100, the microprocessor of control unit initiates the subroutine. This may occur after the adult operator places the child into the seat, secures the vehicle seat belt about the child, and presses a start button on the control unit to activate the unit to evaluate the adjustment of the booster seat. Alternately, the control unit may be automatically activated by the presence of the child as determined by sensor 26.

At step 102, control unit determines whether a child is present in child restraint system 10 based upon the value of the electrical signal from child presence sensor 26. When child 14 is seated, the weight of the child activates the sensor to output a signal, which signal then indicates the presence of the child. The program sets a flag at step 104 to represent that the child is present. At step 106, the program determines whether the vehicle is in motion based upon the output of the accelerometer 40. If the value of the accelerometer signal is less than the threshold, referred to as the moving threshold, the program stores the value as indicative of bias in the accelerometer signal (box 108), to be retrieved for use in correcting subsequent acceleration measurements. If the value of the accelerometer signal exceeds the moving threshold, the control unit presumes that the vehicle has staffed to move. It is pointed out that although a significant acceleration measurement indicates vehicle motion, the vehicle may be in motion without acceleration, as for example while traveling at a constant speed. Thus, in the preferred embodiment, the method does not rely solely upon the then-current accelerometer value, but rather computes an integral of accelerometer values to determine vehicle motion, as described below.

At step 110, the elapsed time is compared to a predetermined sampling rate. A suitable sampling rate may be once per second. If the sampling period has been exceeded, step 112 confirms the presence of the child based upon the flag in step 104. At step 114, the program checks for faulty sensors. A separate subroutine carried out by the control unit evaluates signals from the relevant sensors to determine erroneous signals that indicate a potentially faulty sensor and provides a flag or other suitable instruction accessed by the present subroutine.

After it is determined that the relevant sensors are operating properly, step 116 determines whether the signal from photodetector 34 indicates that the belt is properly received in guide 28. If no fault is indicated, that is, if the signal is properly within the guide, then the system updates the visual display at step 118 to indicate that the belt is adjusted properly. In a preferred display, a properly adjusted belt may be represented by illumination of a green light.

If improper belt adjustment is determined at step 116, the system determines vehicle motion at step 120. Vehicle motion is determined by the integral of signals from accelerometer 40, computed in steps 124 to 132 and stored in a velocity register, as described below. If step 120 determines that the vehicle is in motion, than the control unit activates a warning indicator in step 122. A suitable warning signal is a chime, buzzer, tone or other audible warning effective to alert the operator without necessitating diversion of the operator's vision from the road.

Steps 124 to 132 provide an updated value for use in determining vehicle motion at step 120. At step 124, the program determines whether update based upon the elapsed time since the last update and a predetermined accelerometer signal sampling rate. A suitable sampling rate may be on the order of about 100 microseconds. If the elapsed time is greater than the sampling rate, the program obtains the value of the accelerometer signal at step 126, subtracts the accelerometer bias at step 128 and adds the net value to a velocity register at step 132. Since a positive value indicates forward acceleration, and a negative value indicates deceleration, a vehicle stop is indicated by a zero in the velocity register. Forward motion is represented by a positive value in the velocity register, whereas reverse motion is represented by a negative value. Thus, a non-zero value in the velocity register represents vehicle motion as used in step 120 as a prerequisite to activating the warning indicator in step 122. At step 132, the accelerometer bias is evaluated and updated as necessary for use in step 128 to correct the accelerometer output.

The program includes a power down filter for use in determining whether to repeat steps 110 through 132, or terminate the program at step 148. At step 134 the program confirms the presence of the child based upon the output of sensor 26. If present, the filter is cleared at step 136. If not present, the filter is incremented at step 140. If the filter exceeds a predetermined limit, the child present flag is cleared at step 144, and the status indicators, based upon the recent signal values from the several sensors, are turned off at step 146, before terminating the program at step 148. If the child is present, then the filter is cleared at step 136 and, at step 142, the program returns to step 110 for subsequent re-evaluation of whether the belt has become improperly adjusted since the previous sampling time.

Thus, this invention provides a method and system for monitoring when the status of the belt assembly for the child restraint system changes while the vehicle is in motion. In this manner, the adult operator, after positioning the child and properly adjusting the seat belt, is alerted when the child unlatches the belt in an attempt to exit the seat, while the vehicle is in motion. It is an advantage of the preferred embodiment that the determination of vehicle motion is based upon the integral of the accelerometer signals, as opposed to momentary acceleration. This allows the belt status to be monitored after the vehicle has accelerated to a steady speed without further acceleration, i.e., the acceleration is zero. Thus, the system monitors the child within the seat as the vehicle is traveling at a constant highway speed for an extended time, a situation where a restless child might be tempted to exit the seat.

In the described embodiment, this invention was employed to monitor adjustment of a seat belt used to restrain a child in a booster seat. Booster seats are designed for older children who are more able to disengaging the seat belt than, for example, an infant. Nevertheless, the method may be applied to monitor a belt assembly in a rear facing infant seat or a forward facing infant seat. Also, in the described embodiment, the status of the vehicle seat belt is monitored. Alternately, the method may be carried out to monitor the position of harness assembly that is affixed to the child restraint system.

Further, while the system in the described embodiment monitored the belt assembly based upon the recommended position of the belt within a belt guide, it may be adapted to monitor a latched condition in a buckle assembly used to secure the belt. For this purpose, the buckle assembly may comprise sensors coupled to the control unit to provide a signal indicating that the buckle is properly latched. The control unit may then provide an alert when the buckle is unlatched while the vehicle is in motion.

While this invention has been described in terms of the preferred embodiments thereof, it is not intended to be so limited, but rather only to the extent set forth in the claims that follow.

We claim:

1. A child restraint system comprising
a belt assembly for restraining a child occupant within the child restraint system;
a child presence sensor mounted on the child restraint system and providing a child present signal indicative of a presence of the child occupant within the child restraint system;
a sensor mounted on the child restraint system and providing a belt adjustment signal indicative of proper adjustment of the belt assembly;
a sensor mounted on the child restraint system and providing a vehicle motion signal in response to motion of the vehicle; and
a control unit adapted to receive the child present signal, the belt adjustment signal and the vehicle motion signal and comprising a microprocessor configured to determine whether a child occupant is present, whether the belt assembly is properly adjusted, and whether the vehicle is in motion, and further to provide an alert signal when the child occupant is present, the vehicle is in motion and the belt assembly is not properly adjusted.

2. A child restraint system in accordance with claim 1 wherein the belt assembly comprises a vehicle seat belt or a harness fixed to the child restraint system.

3. A child restraint system in accordance with claim 1 wherein the belt assembly comprises a vehicle seat belt, and the sensor mounted on the child restraint system and providing the belt adjustment signal detects the position of the vehicle seat belt.

4. A child restraint system in accordance with claim 1 wherein the belt assembly comprises a vehicle seat belt, and wherein the child restraint system comprises a guide for properly positioning the vehicle belt seat, said guide comprising the sensor for providing the belt adjustment signal indicative of proper adjustment of the belt assembly, the sensor detecting the vehicle seat belt within the guide.

5. A child restraint system in accordance with claim 1 wherein the sensor providing the vehicle motion signal comprises an accelerometer.

6. A child restraint system in accordance with claim 5 wherein the accelerometer provides a signal based upon vehicle acceleration, and wherein the microprocessor calculates an integral of the vehicle acceleration signals over time and determines vehicle motion based upon the integral.

7. A child restraint system in accordance with claim 6 wherein the control unit provides an alert signal if a child occupant is present, the belt assembly is not properly adjusted and the integral is not 0.

8. A child restraint system in accordance with claim 6 wherein the microprocessor calculates the integral by adding the value of the acceleration signal to a velocity register.

9. A method for monitoring conditions of a child restraint system of a vehicle, said child restraint system comprising a belt assembly for restraining a child occupant within the child restraint system, said method comprising
detecting a child occupant in the child restraint system;
determining whether the belt assembly is properly adjusted for restraining the child occupant;
determining whether the vehicle is in motion; and
if the vehicle is in motion and the belt assembly is not properly adjusted, issuing an alert.

10. A method in accordance with claim 9 wherein the belt assembly comprises a vehicle seat belt or a harness fixed to the child restraint system.

11. A method in accordance with claim 9 wherein the belt assembly comprises a vehicle seat belt, and wherein the method comprises detecting a position of the vehicle seat belt indicative of proper adjustment of the vehicle seat belt.

12. A method in accordance with claim 9 wherein the belt assembly comprises a vehicle seat belt, and wherein the child restraint system comprises a guide for properly positioning the vehicle seat belt, and further wherein the step of determining proper adjustment of the belt assembly is based upon detection of the vehicle seat belt within the guide.

13. A method in accordance with claim 9 wherein the step of determining the vehicle motion comprises receiving an acceleration signal from an accelerometer mounted on the child restraint system and calculating an integral of said acceleration signal over time.

14. A method in accordance with claim 13 wherein the alert is issued if the belt assembly is not properly adjusted and the integral is not 0.

15. A method in accordance with claim 13 wherein the calculating of the integral of the acceleration signal comprises receiving an acceleration signal for the accelerometer and adding the value of the acceleration signal to a velocity register.

* * * * *